Feb. 7, 1956
A. M. BOUDREAU
2,733,928
BABY CARRIAGE LIFT-OUT BODY AND CHASSIS SUPPORT AND INTERLOCK
Filed Jan. 13, 1953
2 Sheets-Sheet 2
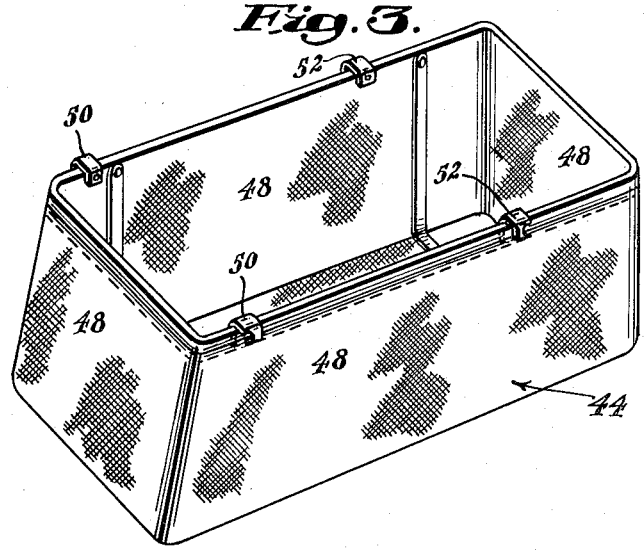
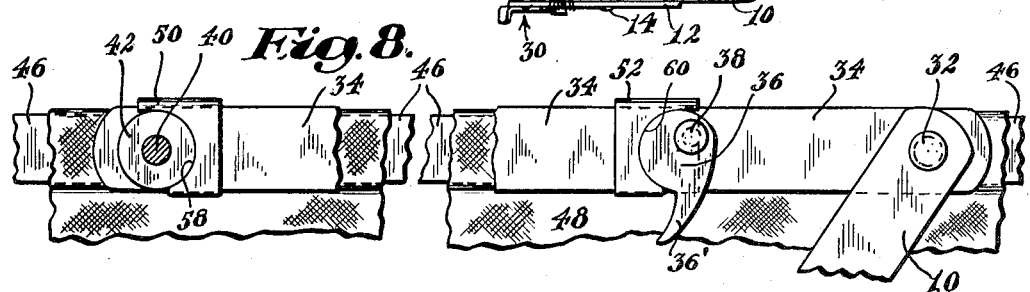
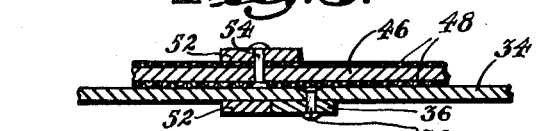
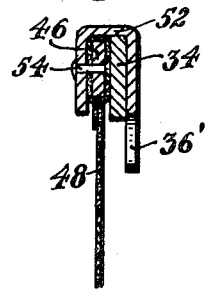

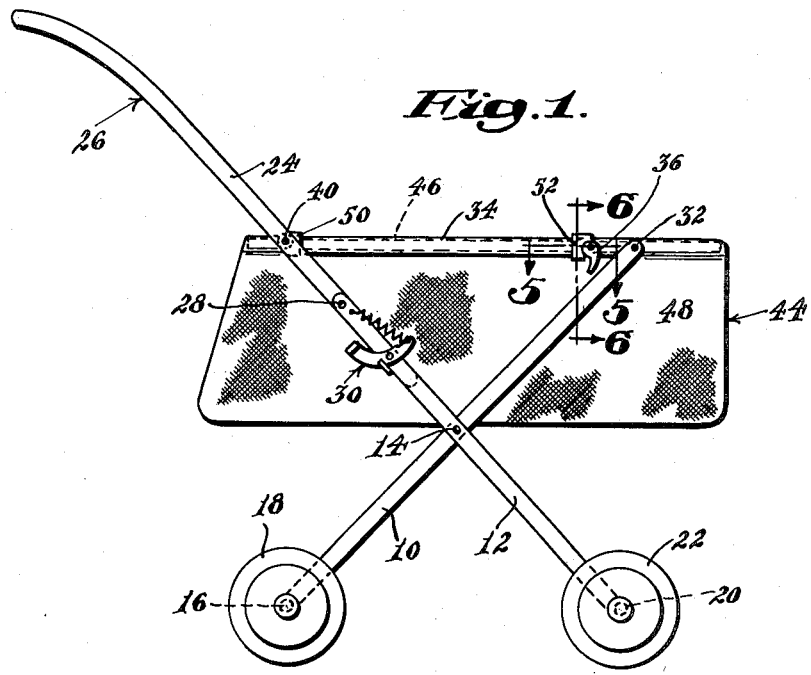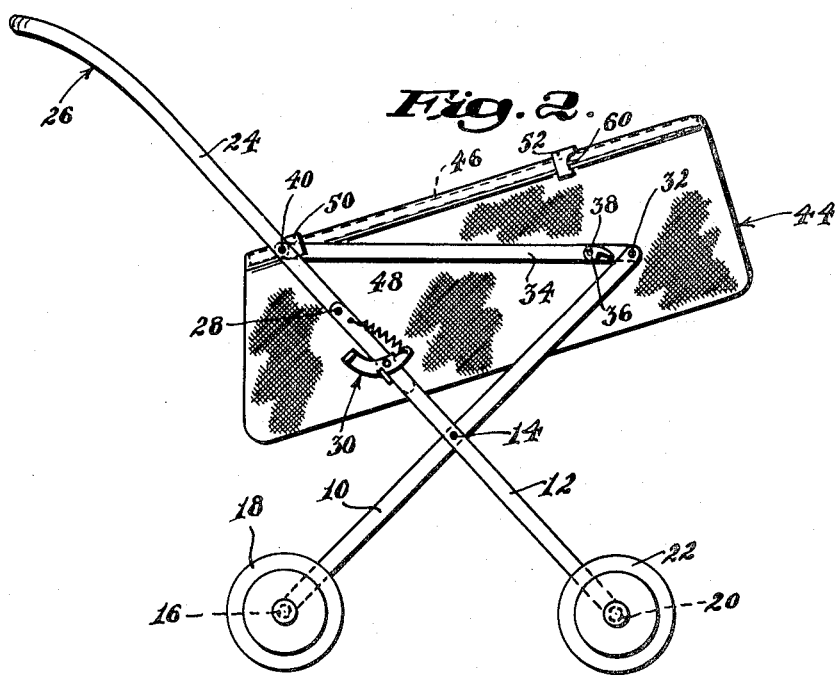

United States Patent Office 2,733,928
Patented Feb. 7, 1956

2,733,928

BABY CARRIAGE LIFT-OUT BODY AND CHASSIS SUPPORT AND INTERLOCK

Alban M. Boudreau, Gardner, Mass., assignor to Hedstrom Union Company, Fitchburg, Mass., a corporation of Massachusetts Application January 13, 1953, Serial No. 331,037

5 Claims. (Cl. 280—31)

This invention relates to improvements in baby carriages and the like and more particularly to such carriages wherein the carriage body is removable from the chassis for separate use as a readily portable bassinet which may be placed on a seat of an automobile or on any other suitable support. The invention provides an improved support for the vehicle body on the chassis and improved means for releasably securing the body to the chassis.

Baby vehicles having removable or lift-out bassinet type bodies have been available for a considerable period of time and the more modern varieties have become quite popular because they ordinarily are light in weight, readily manageable and collapsible as a whole for conservation of space when the vehicles are not in use. However, users of the prior vehicles of the mentioned general type have found it cumbersome and difficult to remove or lift the vehicle body from its chassis and to mount and secure the body on the chassis, especially when a baby may be asleep or reclining in the bassinet-type body.

It is among the objects of the invention to provide a baby carriage, or the like, having a relatively light-weight body which more readily and conveniently may be released and lifted from the chassis as compared with the prior vehicles of a similar variety. According to the invention, the body is suspended between opposite side bars of the chassis, which extend only at the sides of the chassis by means of an abutment at one end of each chassis side bar and a pivoted cam member at the other end of each chassis side bar, the body having a pair of open sided elements for engaging around the chassis side bar abutments whereby the body may be pivotally supported on said abutments in a tilted condition and be either lifted from the abutments while tilted or lowered about the abutments as a fulcrum into operative relation to the chassis side bars, the body having another pair of open sided elements for locking coaction with the cam members when the body is in its said operative relation to the chassis.

Another object of the invention is to provide a baby carriage or the like wherein the carriage chassis has generally horizontal side bars extending only at the opposite sides of the chassis and has pivot elements on the side bars, at one end of the chassis, for pivotal support of one end of a carriage body when the body, in a tilted position, is engaged against the pivotal elements on the chassis side bars, the body being swingable about said side bar pivotal elements to an operative relation to the chassis, and there being coacting locking elements on the chassis side bars and on the carriage body for manually locking the body to the chassis when the body is in its said operative relation to the chassis.

It is, moreover, my purpose and object generally to improve the supporting and locking coaction between a carriage body and the carriage chassis in baby carriages in which the body is of a bassinet type removable from and usable independently of the chassis.

In the accompanying drawings:

Fig. 1 is a side elevation of a foldable baby carriage embodying features of the invention;

Fig. 2 is a view similar to Fig. 1 but showing the carriage body in tilted relation to the chassis as at an intermediate stage in the process of either mounting the body on or removal of the body from the chassis;

Fig. 3 is an isometric view of the carriage body apart from the chassis;

Fig. 4 is a top plan view of the upper frame portions of the chassis at one side of the vehicle, the other side being the same;

Fig. 5 is a cross-sectional fragmentary view on line 5—5 of Fig. 1, on a larger scale;

Fig. 6 is a cross-sectional fragmentary view on line 6—6 of Fig. 1, on the scale of Fig. 5;

Fig. 7 is a fragmentary side elevation of the upper portion of one side of the carriage body, on the scale of Figs. 5 and 6, a central portion of the body being broken away to conserve space; and Fig. 8 is a view similar to Fig. 7, but showing the locking coaction between the body and a side bar of the chassis.

Referring to the drawings, the invention is illustrated as it may be embodied in a light-weight folding type of baby vehicle whose chassis comprises, at each side of the vehicle, two crossing relatively rigid bars 10, 12 pivotally connected together at 14. The lower ends of the bars 10 at opposite sides of the vehicle support an axle 16 which extends between them, with a wheel 18 secured on each end of axle 16. Similarly, the lower ends of the bars 12 at opposite sides of the vehicle support an axle 20 which extends between them, with a wheel 22 secured on each end of axle 20.

The bars 12 are shorter than the bars 10, and the opposite end portions of the arms 24 of the customary U-shaped pusher handle 26 are pivotally connected at 28 to the upper ends of the bars 12, with any usual or suitable releasable locking means 30 for maintaining the pusher handle and bars 12 rigidly but releasably connected together when the vehicle is in its non-collapsed or non-folded condition as herein shown.

The upper end of each bar 10 is pivotally connected at 32 to one end portion of a chassis side bar 34 of which there is one at each side of the chassis. Substantially inward from the end pivot 32 of each side bar 34 a manually operable cam member 36 is pivotally mounted at 38 on each side bar 34. The other end portion of each side bar 34 is pivotally connected at 40 to the adjacent arm 24 of pusher handle 26, each connection at 40 including a spacing washer 42 intervening between the side bar 34 and the adjacent pusher handle arm 24, for a purpose which later will appear.

The particular vehicle body herein shown, indicated generally at 44, has a relatively rigid rectangular top frame member 46 extending all around the top of the body, and may have side and end walls of any suitable flexible material 48 suspended from the top frame member 46. Fig. 6 shows the flexible wall material 48 wrapped and secured around the top frame member 46.

Two inverted generally U-shaped elements 50 are secured to the top frame portion of the vehicle body adjacent to one end of the body, one element 50 at each side of the body. Two generally similar elements 52 are secured to the top frame portion of the vehicle body adjacent to the other end of the body, one element 52 at each side of the body. Fig. 6 is representative of the cross-sectional shape and manner of securement of all of the elements 50, 52, each being secured interiorly of the body to the wrapped top frame member 46 as by a rivet 54. Fig. 6 also shows how the outer leg of each inverted U-shaped element 50, 52 extends in spaced relation to the wrapped top frame member 46 to provide space between them for accommodating the side bars 34 of the chassis.

The outer leg of each element 50 is cut away generally semi-circularly at 58 as best seen in Figs. 7 and 8, for nicely engaging around a substantial portion of the periphery of the spacing member 42 at its side of the chassis, the elements 50 and the spacing washers 42 coacting to pivotally support one end of the vehicle body when the latter, in a tilted condition such as illustrated in Fig. 2, is thrust toward the spacing washers 42, in which condition the body 44 may be lowered or raised about the axis of spacing washers 42, or the body may be lifted free of the spacing washers 42 in the act of removing the body from the chassis.

The outer leg of each element 52 is cut away generally semi-circularly as at 60 (best seen in Figs. 7 and 8) for coaction with the cam members 36 each of which latter is adapted to be manually rotated into locking engagement with the edges of the cut out at 60 in one of the elements 52.

Assuming that the vehicle body 44, in Fig. 2, is being inserted into the chassis, the inclined body, with the washers 42 seated in the cut outs 58 of elements 50 may be lowered about the axis of the washers 42 until the top of the body is generally horizontal and in general parallelism with the chassis side bars 34, with the bridge portions of the inverted U-shaped elements 52 engaging chassis side bars 34 and stopping downward swinging of the body.

The elements 50, 52 on the carriage body and the washers 42 and cam members 36 on the chassis side bars 34 must be relatively located so as to permit lifting and lowering of body 44 about the axis of washers 42 when the cam members 36 are swung to their disengaged positions as portrayed in Fig. 2 wherein only one of the cam members is visible. But, when the body 44 is lowered until the elements 52 stop against the chassis side bars 34, the cut-outs 60 in elements 52 will be opposite the cam members 36 and the cam members may be manually rotated into locking engagement with elements 52. Also, the locking rotation of cam members 36 thrusts the elements 50 more tightly against washers 42. Friction between the cam members and the cut-out edges of elements 52 maintains the cam members relatively strongly in their locking positions, yet finger pressure on the depending tail portion 36' of a cam member 36, counter-clockwise in Figs. 1 and 8, easily and quickly can release the body for removal from the chassis and its removal involves merely a lifting of one end of the body, about an axis at 40, until the body is conveniently tilted, as in Fig. 2, after which the body may be lifted away from the supporting washers 42 and out from between the chassis side bars 34.

Mounting and securement of body 44 on its chassis involves a reversal of the steps described for its removal. The body, in a tilted condition is merely inserted between chassis side bars 34 with the elements 50 engaging around the washers 42, after which the body may be lowered about the washers as a fulcrum until elements 52 stop against the chassis side bars 34. The body then may be securely locked to the chassis by manual rotation of cam members 36, clockwise in Figs. 1 and 8, to their locking positions of Figs. 1 and 8.

It will be obvious that the vehicle chassis structure and the vehicle body structure may be variously modified from what are herein illustrated, and it is intended that the patent shall cover, by suitable expression in the appended claims, whatever features of patentable novelty exist in the invention disclosed.

I claim as my invention:

1. In a baby vehicle having a chassis and a body removably mounted on the chassis, the combination of a pair of generally parallel chassis side bars supported in spaced relation to provide free space for entrance of said body endwise between them with substantial portions of the body extending substantially below said side bars, a pair of pivotal projections on said side bars aligned transversely of the chassis adjacent corresponding ends of the side bars, a pair of open-sided elements fixed at the top margin of said body in transverse alignment at opposite sides of the body adjacent one end portion thereof, whereby said body in slightly tilted condition may be inserted endwise between and thrust along said side bars to pivotally engage said open-sided elements on the body over said pivotal projections on said chassis side bars thereby to provide a pivotal support for the inserted end of the body about which the other end of the tilted body may be lowered to bring the top of the body substantially into the plane of the chassis side bars, and manually operable interengaging means on said chassis side bars and said body for releasably locking the body to the side bars only when the top of the body and the side bars are substantially in a common plane.

2. In a baby vehicle having a chassis and a body removably mounted on the chassis, the combination of a pair of generally parallel chassis side bars supported in spaced relation to provide free space for entrance of said body endwise between them with substantial portions of the body extending substantially below said side bars, a pair of pivotal projections on said side bars aligned transversely of the chassis adjacent corresponding ends of the side bars, a pair of manually operable cam members pivotally mounted on said side bars, one on each side bar substantially spaced from said pivotal projections, a pair of bearing elements fixed at the top of said body in transverse alignment at opposite sides of the body adjacent one end portion thereof, said body being insertible in a tilted condition endwise between and along said chassis side bars, and said pivotal projections on the side bars being adapted to pivotally engage said elements on the tilted body to pivotally support one end of the body when the tilted body is moved endwise toward said projections, and an element fixed at each side of the top of the body in positions for locking coaction with said cam members on the chassis side bars when the top of the body is lowered about said pivotal projections substantially into the plane of said chassis side bars, said cam members being manually operable into and out of locking engagement with said coacting elements at each side of the top of the body.

3. In a baby vehicle having a chassis and a body removably mounted on the chassis, the combination of a pair of generally parallel chassis side bars mounted in spaced relation to provide free space at an end of the vehicle for entrance of said body endwise between them with substantial portions of the body extending substantially below said side bars, a pair of pivotal projections on said side bars aligned transversely of the chassis adjacent corresponding ends of the side bars, a pair of manually operable members pivotally mounted on said side bars, one on each side bar substantially spaced from said pivotal projections, a pair of notched elements fixed at the top of the body in transverse alignment at opposite sides of the body adjacent one end portion thereof, said notched elements being adapted to be pivotally engaged around said pivotal projections when said body, in a tilted condition, is thrust endwise between and along said side bars toward said projections with said projections and notched elements in relative positions for said projections to enter the notches of the notched elements, said body being movable about said projections to bring its top substantially into the plane of said chassis side bars, and means on the top of the body substantially spaced from said notched elements for locking coaction with said manually operable members on the chassis side bars, said manually operable members being operable into and out of locking coaction with said means on the top of the body when the top of the body and the chassis side bars are substantially in a common plane.

4. In a baby vehicle having a chassis and a body removably mounted on the chassis, the combination of a pair of generally parallel chassis side bars mounted in spaced relation to provide free space at at least one end of the vehicle for entrance of said body endwise between them with substantial portions of the body extending substantially below said side bars, a pair of pivotal projections on said side bars aligned transversely of the chassis adjacent corresponding ends of the side bars, a pair of manually operable members pivotally mounted on said side bars, one on each side bar substantially spaced from said pivotal projections, a pair of bearing elements at one end of the body at opposite sides of a top region thereof, each said bearing element having an open side for engaging around a said pivotal projection when the body, in a tilted condition, is inserted endwise between said chassis side bars and thrust along said side bars generally toward said pivotal projections, said body being movable about the axis of said pivotal projections to lower the top of the body substantially into the plane of said chassis side bars, and means on the top of the body substantially spaced from said bearing elements for stopping the lowered body and for locking coaction with said manually operable members, the latter said members being operable into and out of locking engagement with said means on the top of the body for securing the body to and releasing it for removal from the said chassis side bars.

5. In a baby vehicle having a chassis and a body removably mounted on the chassis, the combination of a pair of generally parallel chassis side bars mounted in spaced relation to provide free space at an end of the vehicle for entrance of said body endwise between them with substantial portions of the body extending substantially below said side bars, a pair of pivotal projections on said side bars aligned transversely of the chassis adjacent corresponding ends of the side bars, a pair of manually operable members pivotally mounted on said side bars, one on each side bar substantially spaced from said pivotal projections, a rectangular top frame for the body extending all around the body, a pair of bearing elements on the body top frame at one end of the body, one at each side thereof, a pair of locking elements on the body top frame substantially spaced from said bearing elements, one at each side of the body, said bearing elements being notched for receiving said pivotal projections on the chassis side bars when the body, in a tilted condition, is inserted endwise between the side bars and thrust along said side bars toward said pivotal projections, thereby to pivotally support one end of the tilted body as the body top frame is being lowered substantially into the plane of said chassis side bars to bring said locking elements on the body top frame into coacting relation to said manually operable members on the chassis side bars, the latter said members being manually operable into and out of locking engagement with said locking elements when the body top frame and the chassis side bare are substantially in a common plane.

References Cited in the file of this patent

UNITED STATES PATENTS

| | | |
|---|---|---|
| 245,327 | True | Aug. 9, 1881 |
| 456,490 | Herz | July 21, 1891 |
| 1,008,713 | Grace | Nov. 14, 1911 |
| 1,277,361 | Bauman | Sept. 3, 1918 |
| 1,470,630 | Mahr | Oct. 16, 1923 |
| 1,923,785 | Holan | Aug. 22, 1933 |
| 2,593,962 | Barker | Apr. 22, 1952 |

FOREIGN PATENTS

| | | |
|---|---|---|
| 567,406 | France | Mar. 1, 1924 |
| 1,014,266 | France | May 28, 1952 |